Aug. 26, 1969    S. M. BUDD    3,463,658
PROCESS FOR PRODUCING A GLASS WITH A
DIFFUSED LAYER AND A COATING
Filed March 24, 1967
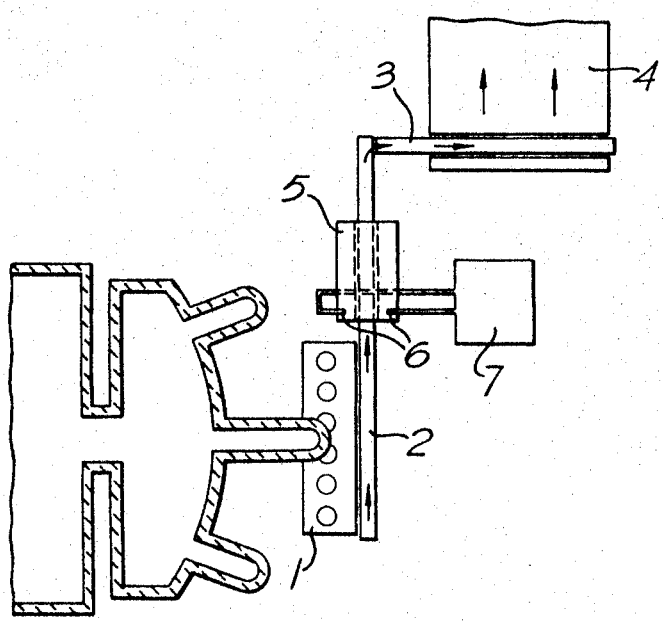
INVENTOR
Sidney Maurice Budd
BY
Cushman, Darby & Cushman
ATTORNEYS United States Patent Office 3,463,658
Patented Aug. 26, 1969

3,463,658
PROCESS FOR PRODUCING A GLASS WITH A DIFFUSED LAYER AND A COATING
Sidney Maurice Budd, Edgware, England, assignor to United Glass Limited, Staines, Middlesex, England, a corporation of the United Kingdom
Filed Mar. 24, 1967, Ser. No. 625,729
Claims priority, application Great Britain, Mar. 31, 1966, 14,354/66, 14,355/66
Int. Cl. C03c *17/00;* B44d *1/12*
U.S. Cl. 117—69          8 Claims

ABSTRACT OF THE DISCLOSURE

A glass container having a surface coating of tin oxide or titanium oxide and a diffused layer beneath the surface containing tin oxide or titanium oxide is prepared. The containers are prepared by treating the containers while still hot from the forming operation with a liquid solution of an organic compound of tin or titanium, which upon application of heat decomposes into a compound of high decomposition temperature which diffuses into the glass and a volatile compound which reacts with the surface of the glass and forms a coating thereon.

---

This invention relates to the treatment of glass containers, whereby we mean glass bottles, jars, tumblers, beakers, tableware, stemware, ovenware, cups, and like glass vessels, and is especially concerned with a process for increasing the mechanical strength of such articles.

Over the past years the users of glass containers have been subjecting bottles, jars and the like to increasing impact and abrasion because of greater handling speeds on bottle filling machinery and associated equipment. This has necessitated the manufacture of stronger containers than hitherto so as to withstand such increased impact and abrasion. One way of making a container stronger is by increasing its wall thickness, but a container made stronger in this way would be an unattractive proposition, since it would be heavier and hence more costly to transport, and more costly to manufacture. It is an object of the present invention to provide glass containers which, although no heavier, are stronger than those made hitherto.

As a result of the increased handling speeds in container filling plants there is a greater tendency these days for containers to be abraded by each other during transport to washers, fillers, craters and decraters, cappers, labellers, and the like. We have found that such abrasion reduces the strength of the containers. Furthermore, for containers which are re-used many times such abrasion is cumulative, and containers which have been in use for some time may be substantially weaker than they were originally. In addition the abrasion of one container by another may produce unsightly marks on the surfaces of the containers with the result that after a while the containers may become too unsightly to use. It is a further object of this invention to provide glass containers which, on abrasion between glass of like kind, do not suffer the same loss of strength as, or acquire abrasion marks to the degree of, those made hitherto.

The increasing use of domestic dish washing machines, as well as similar machines in industrial use, has imposed greater requirements on the strength and abrasion resistance of glass tableware and stemware than hitherto. For aesthetic reasons this type of glassware is generally constructed with thin wall sections, and the increasing abrasion and impact caused by mechanical handling of this ware may result in greater breakage, or in more unsightly ware. It is an object of this invention to provide glass tableware and stemware which, although no heavier than that made hitherto, are stronger and more resistant to abrasion.

The manufacture of glass bottles and jars, and of most glass tableware and stemware, is now a highly automated process. It is, therefore, essential that any additional process introduced should not interfere with existing processes, and furthermore it should not introduce additional handling of the ware, for it is known that any handling of glass while it is hot may result in a substantial weakening of the container. Glass containers and vessels are manufactured by automatic means in a wide variety of sizes, shapes and colours, and glassware manufacturing plant may vary considerably with the type of ware manufactured. Any additional process should preferably be capable of performing satisfactorily on all the range of ware manufactured by automatic means. It is a further object of this invention to provide a process for treating glass containers and vessels which process can be incorporated into any process for the automatic manufacture of glassware without interference to the normal running of such process, and without additional handling of ware during the additional process.

The automatic production of glass containers and vessels is also a 24-hour continuous process, and clearly it is desirable that any additional process introduced into this manufacture should not require continuous attention, and in the event of variability in the additional process it would clearly be disadvantageous if some deleterious side effect were produced. Accordingly it is a further object of this invention to provide a process for increasing the mechanical strength and abrasion resistance of glass containers and vessels, which process may be incorporated into the process for automatic manufacture of glassware without interference to the normal running of such process, and such that supervision is not greater than that which would normally be required for a process of this type.

According to the invention a process for increasing the mechanical strength and abrasion resistance of glass containers comprises treating the containers, while at a high temperature, with a liquid solution of an organic compound of tin or titanium, which compound has properties such that upon application of heat it decomposes into two materials, one of which is an organic compound of tin or titanium of high decomposition temperature which reacts with the glass surface at high temperatures to produce a diffusion layer of tin oxide or titanium oxide within the glass surface, while the other is a volatile compound of tin or titanium such that a substantial proportion of the vapour of said compound is produced, and subjecting the containers to a heat treatment such that a reaction is caused to occur between the glass at at least the surfaces of the containers and the tin or titanium compounds.

In practice, the liquid solution is applied to the containers as they emerge from the forming machine, and immediately following the application of this material to the hot glass, the glass containers are passed into an oven for a heat treatment. The temperature and duration of this heat treatment will depend to some extent upon the composiion of the glass which is being treated, but as a general indication it is preferred that the temperature should be maintained at 550° C. or more for at least five minutes. In certain cases, where the glass viscosity is lower, this temperature may be reduced to 500° C. Normally, this heat treatment can be provided by annealing the glass containers to a satisfactory commercial standard immediately after manufacture and treatment with the organic tin or titanium compound.

The material used for treating glass containers in accordance with the invention may be provided by reacting a tin or titanium tetrahalide, e.g., tin tetrachloride or titanium tetrachloride, with organic substances containing carbonyl groups of moderate activity. A particularly useful series of organic substances for this purpose are the organic esters of ethyl, n-propyl, isopropyl, n-butyl, isobutyl, and iso-amyl alcohols with acetic, propionic and butyric acids. In addition, organic ethers of titanium, such as titanium tetra-n-butoxide may be incorporated into the mixture. The proportions of the various ingredients used will depend considerably upon the particular ingredients, but these proportions should be such that the final material, when brought into contact with the hot glass, will decompose to give both a volatile metal compound and a stable metal organic compound. The suitability of a particular mixture may be determined by dropping a small quantity of the mixture on to a glass surface heated to 500° C. If the presence of a heavy vapour containing a metal compound can be observed, together with some of the mixture having remained on the glass surface, then the mixture is suitable.

The preferred material for use in this invention is prepared by reacting tin tetrachloride with n-butyl acetate. This reaction may be carried out by carefully adding the tin tetrachloride to the butyl acetate at room temperature, with stirring or some other form of agitation to ensure thorough mixing. Heat is evolved in this reaction, and the rate of addition must be controlled so that the temperature rise is limited to a few degrees C., otherwise some tin compound may be lost in vapour form. The preferred mixture contains from 20–60% by weight of tin tetrachloride, a mixture containing 40% by weight tin tetrachloride and 60% by weight n-butyl acetate being most useful.

A preferred method of carrying out the invention is to spray the hot containers with the treating medium immediately after they leave the forming machine and before they enter the annealing lehr, and a particularly effective way of treating the containers or vessels is by passing them through a very fine mist of the treating medium.

The invention will now be described with reference to the accompanying drawing, which is a diagrammatic plan view showing a container forming machine, a first conveyor, a hood or tunnel in which treatment takes place, a second conveyor, and an annealing lehr.

Referring to the drawing, there is shown an automatic bottle forming machine 1 delivering bottles on to a 1st conveyor 2. Previously such bottles, at a temperature of 400–650° C., would have been transferred to a second conveyor 3 from whence they entered an annealing lehr 4. In accordance with this invention a tunnel or hood 5 is mounted over conveyor 2. The tunnel may be as little as 18″, or up to several feet, long. Preferably it will be between two and three feet long, and it may be mounted on the framework of the conveyor or suspended from some independent point. Hot bottles emerging from the forming machine 1 pass, on conveyor 2, through this tunnel wherein is created a mist of liquid reagent so that a layer of such reagent is formed on all external surfaces of the bottles, including the bottom, which becomes so treated by the action of the reagent film present on the conveyor belt, as a result of spray coagulation with such conveyor belt. Contact of the liquid reagent with the hot glass results in decomposition of the reagent, with the effect that a substance of high decomposition temperature is left adhering to the glass surface, and simultaneously the vapour of a metallic compound is provided inside the tunnel. The bottles then pass on to the second conveyor 3 and into the lehr 4 in the normal manner. The mist of liquid reagent is created by mounting atomisers 6 at suitable holes in the sides of the tunnel. These atomisers may be of the pressure jet variety. Preferably they atomise by mixing a stream of liquid with air at 5–20 pounds per square inch pressure. The liquid, which may, for example, be provided by reacting 40 parts by weight of stannic chloride with 60 parts by weight of n-butyl acetate, is pumped to each atomiser by a metering pump 7 fed from a reservoir.

As an alternative to the above, the tunnel or hood may be mounted over the second conveyor instead of over the first conveyor. The number of atomisers feeding the tunnel will normally be between two and twelve, and the flow rate of liquid through each atomiser, which may be independently varied, will normally be in the range of 1–12 mls. per minute. However, variables such as these will in most cases depend on the size of the machine, the output thereof, the speed of the conveyors, the concentration of the treating liquid, and so on.

We have found that, other things being fixed, the flow rate of liquid to the atomisers is an important variable, and there is an optimum value of flow rate for producing the most beneficial effect. For most cases we have found that successful treatment of glass containers and vessels can be obtained by using two atomisers, the flow of liquid through each being 2.5 mls./minute.

The following examples are given for the purpose of illustrating the invention.

Example 1

Straight-sided round bottles were produced on an automatic bottle forming machine at a speed of approximately 70 bottles per minute. After leaving the forming machine the bottles were allowed to pass through a tunnel of length 3′, wherein were situated two atomisers, one on each side of the tunnel. A treating reagent which had been prepared by reacting 40 parts by weight tin tetrachloride with 60 parts by weight n-butyl acetate was metered to each atomiser at a rate of 2.5 mls. per minute per atomiser, and the atomising was carried out by air at 10 lbs./sq. in. After passing through the tunnel the jars were transferred into an annealing lehr and annealed in the normal way. After annealing, the bottles were tested by the hydraulic pressure strength method to find the maximum pressure which the bottles would withstand without fracture, and the bottles after treatment were found to withstand from 225–400 lbs./sq. in., with an average of 325 lbs./sq. in., whereas similar but untreated bottles withstood 112–150 lbs./sq. in., with an average of 137 lbs./sq. in.

Example 2

Hexagonal shaped bottles were manufactured on an automatic machine at a speed of 60 bottles per minute. The bottles were treated similarly to those described in Example 1. After the bottles had been annealed in the normal manner, they were subjected to a controlled amount of abrasion by placing them on a continuous circular conveyor fitted with a spring loaded gate which caused the bottles to impact and abrade one against the other. After five minutes of such abrasion the bottles were tested by the hydraulic pressure test method, and were found to have an average bursting pressure of 225 lbs./sq. in. Similarly manufactured, but untreated, bottles were found to have an average bursting pressure of 125 lbs./sq. in.

Example 3

Domestic cups were produced from borosilicate glass on an automatic forming machine at a speed of 10 cups per minute. The cups were treated similarly to the bottles described in Examples 1 and 2. After the cups had been annealed in the normal way they were tested for impact resistance by subjecting the rim to impact by a falling weight. Treated cups were found to have an average impact resistance of 7 in./lbs., and the proportion of cups which failed at 4 in./lbs. or less was only 10%. Similarly manufactured cups, but untreated, had an average impact resistance of 4½ in./lbs. and 40% of these cups failed at an impact of 4 in./lbs. or less.

What I claim is:

1. A process for the manufacture of glass containers of substantially improved strength and abrasion resistance which comprises the steps of (a) forming the containers, (b) treating the formed containers by spraying the formed containers while still hot from the forming operation with a liquid solution of an organic compound of tin or titanium, which compound upon application of heat decomposes into two materials, one of which is an organic compound of tin or titanium of high decomposition temperature, and the other is a volatile compound of tin or titanium such that a substantial proportion of the vapor of said compound is produced, and (c) subjecting the treated containers to a heat treatment whereby the compound of high decomposition temperature diffuses into the glass and the volatile compound reacts with the surface of the glass.

2. The process of claim 1 where step (b) consists of spraying the formed containers while still hot from the forming operation with a liquid reagent formed by reacting a tin tetrahalide or a titanium tetrahalide with an organic ester.

3. A process as claimed in claim 1 wherein the heat treatment comprises maintaining the containers at least 550° C. for at least 5 minutes.

4. A process as claimed in claim 1 wherein the said liquid solution is prepared by reacting tin tetrachloride or titanium tetrachloride with a carbonyl group-containing organic compound.

5. A process as claimed in claim 4 wherein the carbonyl group-containing compound is an ester formed by reaction of a member selected from the group consisting of ethyl, n-propyl, iso-propyl, n-butyl, isobutyl and iso-amyl alcohol with an acid selected from the group consisting of acetic, propionic and butyric acid.

6. A process as claimed in claim 4 wherein the said solution is prepared by reacting from 20–60% by weight of tin tetrachloride or titanium tetrachloride with the said organic compound.

7. A process as claimed in claim 6 wherein the said solution is prepared by reacting 40% by weight tin tetrachloride and 60% by weight n-butyl acetate.

8. A glass container having a surface coating of tin oxide or titanium oxide and beneath the surface having a diffuse layer containing tin oxide or titanium oxide, and which is produced by the process of claim 1.

References Cited
UNITED STATES PATENTS

| | | | |
|---|---|---|---|
| 2,478,817 | 8/1949 | Gaiser | 65—60 XR |
| 2,703,949 | 3/1955 | Gaiser | 65—60 XR |
| 3,352,707 | 11/1967 | Pickard | 65—60 XR |

S. LEON BASHORE, Primary Examiner

J. H. HARMAN, Assistant Examiner

U.S. Cl. X.R.

65—30, 60; 117—94, 118, 124